United States Patent
Jenkins

(10) Patent No.: US 9,151,327 B2
(45) Date of Patent: Oct. 6, 2015

(54) BACKUP LUBRICATION SYSTEM FOR A ROTOR BEARING

(75) Inventor: Maurice A. Jenkins, Casselberry, FL (US)

(73) Assignee: SIEMENS AKTIENGESELLSCHAFT, München (DE)

(*) Notice: Subject to any disclaimer, the term of this patent is extended or adjusted under 35 U.S.C. 154(b) by 964 days.

(21) Appl. No.: 12/813,638

(22) Filed: Jun. 11, 2010

(65) Prior Publication Data

US 2011/0303491 A1 Dec. 15, 2011

(51) Int. Cl.
- F16N 29/04 (2006.01)
- F16C 33/10 (2006.01)
- F16C 17/24 (2006.01)
- F16C 17/20 (2006.01)

(52) U.S. Cl.
CPC .............. *F16C 33/10* (2013.01); *F16C 17/20* (2013.01); *F16C 17/24* (2013.01)

(58) Field of Classification Search
USPC ............... 184/6, 6.1, 6.4, 6.5, 6.14, 7.1, 7.4
See application file for complete search history.

(56) References Cited

U.S. PATENT DOCUMENTS

| | | | |
|---|---|---|---|
| 1,997,700 A | 11/1933 | Short | |
| 3,280,031 A | 10/1966 | Brennan et al. | |
| 3,610,712 A | 10/1971 | Endress | |
| 3,779,345 A | 12/1973 | Barnes et al. | |
| 3,941,437 A | 3/1976 | MacInnes et al. | |
| 3,993,370 A | 11/1976 | Woollenweber | |
| 4,119,551 A | 10/1978 | Yaffe | |
| 4,153,141 A * | 5/1979 | Methlie | 184/6.2 |
| 4,390,082 A | 6/1983 | Swearingen | |
| 4,431,372 A * | 2/1984 | Dadhich | 415/175 |
| 4,436,654 A | 3/1984 | Ohe et al. | |
| 4,511,016 A | 4/1985 | Doell | |
| 4,709,785 A * | 12/1987 | Csanady, Jr. | 184/6.4 |
| 4,717,000 A | 1/1988 | Waddington et al. | |
| 4,848,926 A | 7/1989 | Jenkins | |
| 4,888,947 A | 12/1989 | Thompson | |
| 5,038,893 A * | 8/1991 | Willner et al. | 184/7.4 |
| 5,046,306 A * | 9/1991 | Borre, Jr. | 60/39.08 |
| 5,907,192 A | 5/1999 | Lyons et al. | |
| 6,312,215 B1 | 11/2001 | Walker | |
| 6,326,336 B1 | 12/2001 | Gatto et al. | |
| 6,481,978 B2 * | 11/2002 | Zamalis et al. | 417/228 |
| 7,017,712 B1 * | 3/2006 | Rake et al. | 184/6.4 |
| 7,174,997 B2 | 2/2007 | Sheridan | |
| 7,225,626 B2 * | 6/2007 | Robinson et al. | 62/84 |

(Continued)

*Primary Examiner* — William E Dondero
*Assistant Examiner* — Mark K Buse

(57) ABSTRACT

A pressurized backup lubricant reservoir (36) with a lubricant line (31) to a rotor bearing (21). A control valve (43) on the backup lubricant line is normally closed. A monitor/controller (44) monitors multiple parameters of the bearing, and initiates an emergency protection sequence under combinations of conditions, including when a temperature of the bearing exceeds a threshold and a flow rate or pressure of a primary lubricant is outside a normal range and the rotor is rotating. The emergency protection sequence initiates a shutdown procedure for the rotor, and opens and modulates the control valve to meter a backup lubricant (33) from the backup reservoir to the bearing in proportion to a rundown rate of the rotor, such that lubrication of the bearing from the backup lubricant reservoir continues until the rotor stops turning. The protection sequence may also include coordinating braking of the rotor with the backup lubricant flow.

14 Claims, 3 Drawing Sheets

(56) References Cited

U.S. PATENT DOCUMENTS

| | | |
|---|---|---|
| 7,387,189 B2 * | 6/2008 | James et al. ............... 184/6.11 |
| 7,448,198 B2 | 11/2008 | Trumper et al. |
| 7,997,385 B2 * | 8/2011 | Yanohara ..................... 184/6.1 |
| 2004/0040789 A1 * | 3/2004 | Rake et al. .................. 184/6.23 |
| 2005/0000753 A1 * | 1/2005 | Sheridan ..................... 184/55.1 |
| 2008/0083585 A1 * | 4/2008 | Yanohara ..................... 184/6.1 |
| 2008/0196974 A1 * | 8/2008 | Galivel ........................ 184/6.4 |

* cited by examiner

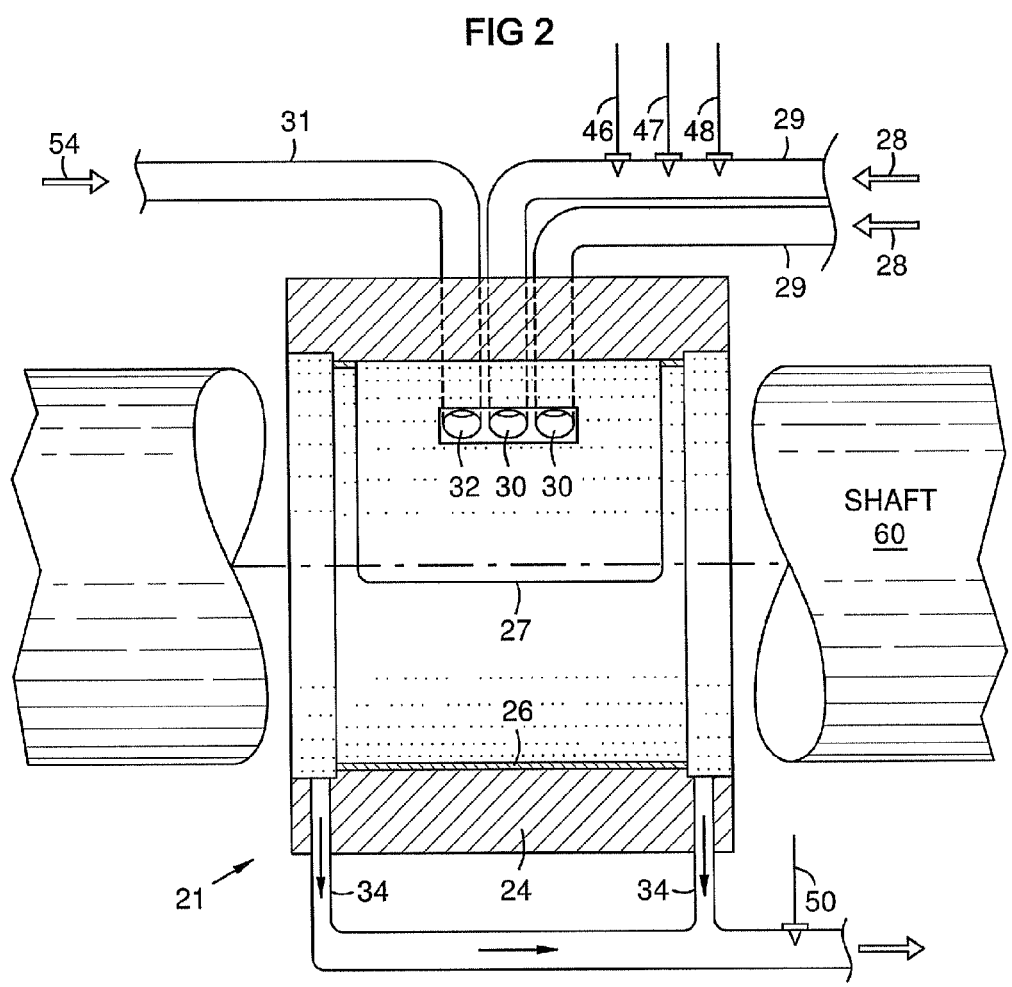

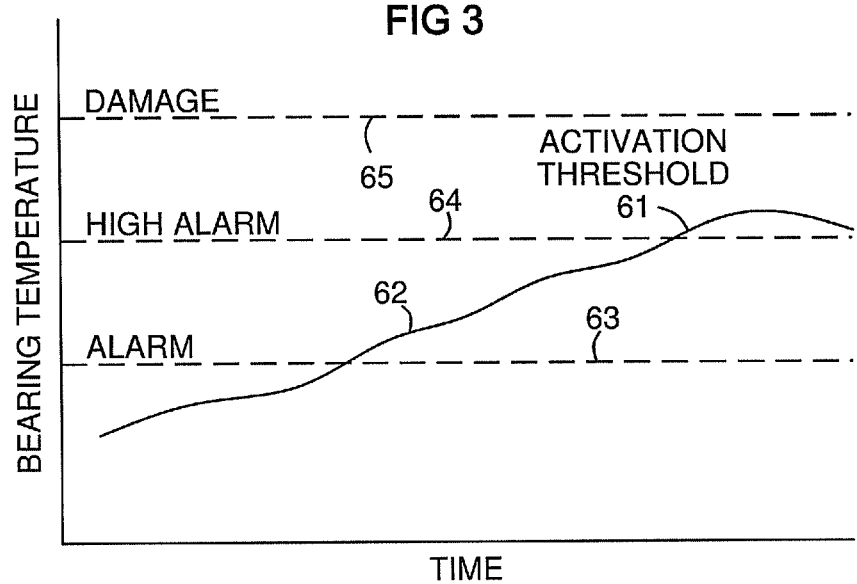
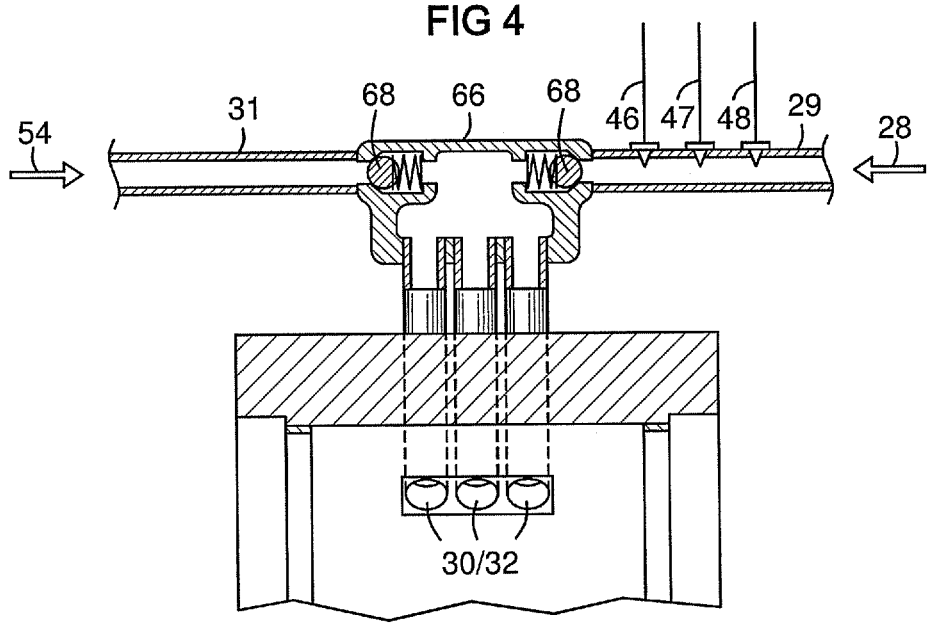

BACKUP LUBRICATION SYSTEM FOR A ROTOR BEARING

FIELD OF THE INVENTION

The present invention relates to emergency backup lubrication of rotor bearings, especially journal type bearings. It further relates to automated protection and shut-down of rotating machinery, particularly in the field of power generation.

BACKGROUND

Machinery with rotors, such as electrical generators, steam and gas turbines, and large motors, commonly use journal type main bearings due to their high load-carrying capacity. In a journal bearing the rotor shaft is supported on a film of oil in clearance between the journal and the bearing inner surface or babbitt. The oil film is maintained by the rotation of the journal. Oil circulates through the bearing and exits through a drain line, then recirculates via a pump, filter, reservoir, and cooler. Circulation maintains the oil film, cools the bearing, and removes contaminants. If oil pressure is lost, the journal settles onto the babbitt and frictionally overheats, causing extensive damage to the shaft, bearing, and other parts.

In power generation equipment, the rotor may take about an hour to rundown during a non-braked shutdown. Even with braking, a rundown with a loss of bearing lubrication has time to cause serious damage.

SUMMARY OF THE INVENTION

An aspect of the present invention involves providing automated backup lubrication from a reserve tank to a rotor bearing upon failure of the primary oil system. When a lube oil system is equipped with a secondary backup, the invention serves as a tertiary backup for the lube oil system.

Another aspect of the present invention involves analyzing multiple sensor inputs such as the primary lubricant pressure and/or flow rate, the rotor shaft rotation speed, and the bearing temperature, to determine when and how much reserve oil to supply to a bearing.

Another aspect of the invention involves providing a passively pressurized reserve oil tank with no need for pumping or engine compressor bleeds during a protection sequence. This increases reliability and reduces complexity.

Another aspect of the invention involves providing a reserve lubricant that is more fire resistant or retardant than the primary oil.

Yet another aspect of the present invention involves automatically braking the rotor, and coordinating the backup lubricant flow rate with the rotor rundown rate, such that the backup lubricant lasts until the rotor stops.

BRIEF DESCRIPTION OF THE DRAWINGS

The above mentioned and other concepts of the present invention will now be described with reference to the drawings of the exemplary and preferred embodiments of the present invention. The illustrated embodiments are intended to illustrate, but not to limit the invention. The drawings contain the following figures, in which like numbers refer to like parts throughout the description and drawings wherein:

FIG. 2 is a side sectional view of a bearing per aspects of the invention.

FIG. 3 shows an activation threshold for a protection sequence.

FIG. 4 shows a fitting for connecting primary and backup lubricant lines to a bearing.

DETAILED DESCRIPTION OF THE INVENTION

Figure 1:
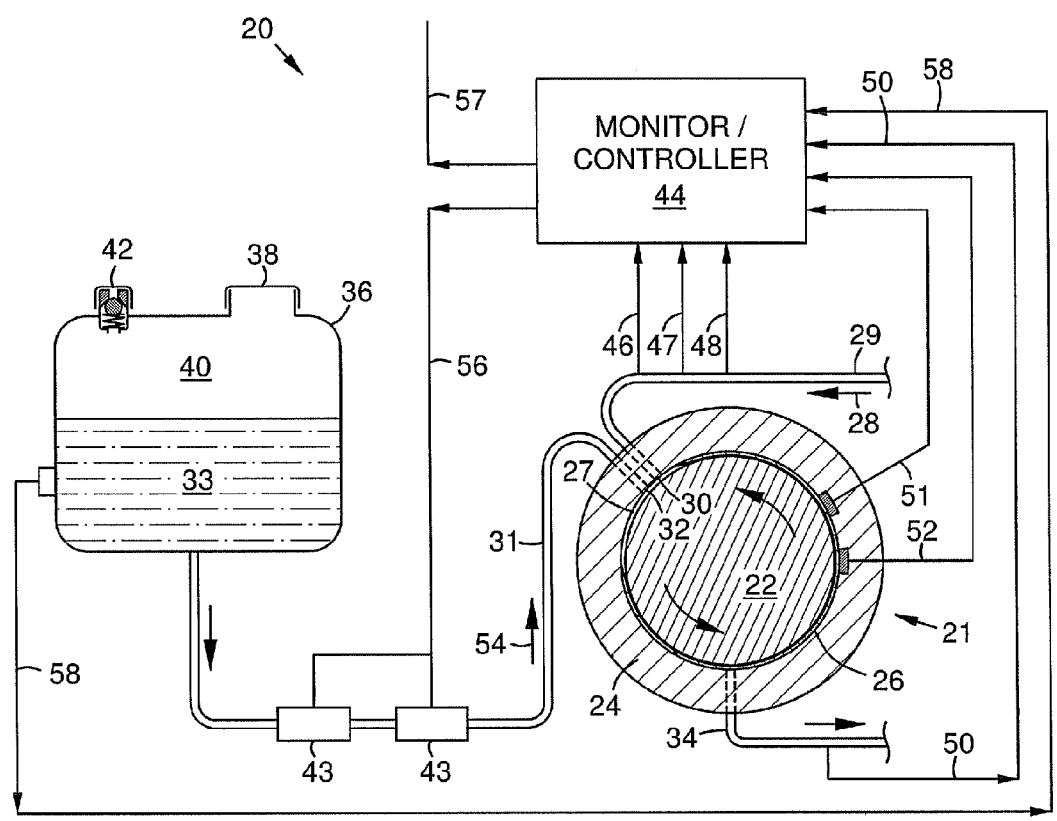
FIG. 1 is a schematic view of a backup lubrication system for a rotor bearing according to aspects of the invention.

FIG. 1 schematically shows a bearing lubrication system 20 according to aspects of the invention. A journal type bearing 21 has a journal 22 that rotates within a bearing shell 24. The shell may have an inner liner called a babbitt 26 with a relief portion 27 as known in the art. A primary lubricant 28 is supplied by one or more lines 29 to an outlet 30 in the bearing in the clearance between the journal and shell. The relief 27 in the babbitt allows the lubricant to spread axially over the journal surface before being drawn in between the journal and babbitt to support the journal. A drain line 34 recycles the lubricant 28 to a pump, filter, primary reservoir, and possibly a cooler not shown.

In the event of failure of the primary lubrication system 28, 29, 30, a backup lubricant line 31 supplies a reserve lubricant 33 to the bearing 21 via an outlet 32 in the bearing. A backup lubricant tank 36 may have a filler opening 38 and passive pressurization means such as compressed air or nitrogen 40, or an elastic bladder or diaphragm, or a piston and spring. "Passive" means that during activation of the backup lubrication system in a protection sequence an active motive force, such as a pump or a compressor bleed is not needed. A gas input valve 42 may be provided for pressurization, whish may be similar to a tire valve. One or more control valves 43 such as solenoid valves on the backup lubricant line 31 are normally closed. Dual valves 43 as shown may be provided for redundancy to assure that no unplanned release of the reserve lubricant 33 occurs.

A monitor/controller 44 monitors and analyzes several parameters such as the primary lubricant inlet pressure 46, primary lubricant inlet flow rate 47, primary lubricant inlet temperature 48, drain lubricant temperature and/or flow rate 50, bearing temperature 51, shaft rotation speed 52 and/or backup lubricant tank level 58. Sensor/transducers are known such measurements, including thermocouples and resistance temperature detectors, hall-effect shaft rotation sensors, and the like. A combined fluid temperature and flow rate sensor is described in U.S. Pat. No. 4,848,926 of the present inventor.

The monitor/controller 44 includes logic and a processor that analyzes combinations of the input parameters to determine if and when to activate the backup lubricant flow 54. Upon reaching this decision, the monitor/controller initiates a protection sequence by signaling 56 the control valve(s) 43 to open. It may also signal 57 a main controller (not shown) to shut-down the rotor. The monitor/controller may be self-contained or it may be part of the main controller, comprising one or more software modules and sensor interface circuits in the main controller.

FIG. 2 is a side sectional view of a journal bearing for a rotor shaft 60. One or more primary lubricant inlet lines 29 and one or more primary lubricant outlets 30 may be provided. Providing multiple primary 30 outlets and/or backup 32 outlets improves lubricant distribution, but is not essential. Primary and backup outlets may be arranged symmetrically about an axial midpoint of the bearing in a sequence such as 30-32-30 or 30-32-30-32-30 or 32-30-32. This distributes both the primary and backup lubricants symmetrically. The primary input lines 29 may or may not be duplicated as shown. A single line 29 may supply multiple outlets via a fitting as later shown.

The monitor/controller 44 may initiate an emergency protection sequence when the bearing temperature is above a respective threshold such as a high alarm temperature and the primary lubricant pressure or flow rate is outside a normal range and the shaft is rotating. It may also initiate the emergency protection sequence when the bearing temperature is above threshold, and a bearing lubricant drain has a flow rate below a threshold and the shaft is rotating. It may also initiate the protection sequence if the primary lubricant inlet temperature is above a threshold.

FIG. 3 illustrates a rising bearing temperature 62 and an activation threshold 61 when the bearing temperature exceeds both an alarm temperature 63 and a high alarm temperature 64 prior to a damage threshold 65.

The backup lubricant 33 may be a fire resistant oil or grease known in the art. An example is Dupont™ Krytox®, which is a liquid fluoropolymer, similar to liquid Teflon®. The backup lubricant may be different from the primary lubricant, and may be optimized for high-temperature, low-oxidation performance. It may have fire retardant properties. Further examples of fire resistant and retardant lubricants are described in U.S. Pat. Nos. 4,436,654, 6,326,336 and 6,326,336.

FIG. 4 schematically illustrates an exemplary fitting 66 that uses all of the oil outlets in the bearing as both primary 30 and secondary 32 outlets. This can retrofit an existing bearing for installation of the present backup system. Check valves 68 prevent backflow in the primary and backup lubricant lines 29 and 31 when the other line is active. With this fitting 66 only one outlet 30/32 is needed.

The controller/monitor 44 may initiate braking of the rotor. It may modulate the braking rate and/or the backup lubricant flow rate such that the backup lubrication lasts until the rotor stops turning, and it may utilize the backup lubricant tank level signal 58 as part of that logic. Rotor brakes of various kinds are known. For example, wind turbines can be braked by feathering the blades, stalling the blades, using mechanical disc or drum brakes, and/or using the generator as a brake via resistors.

The present invention is disclosed in context of use of lubrication of a bearing on a rotating shaft, especially for a main journal bearing on a rotor of power generating equipment.

While the invention has been described in terms of a certain preferred embodiment and suggested possible modifications thereto, other embodiments and modifications apparent to those of ordinary skill in the art are also within the scope of this invention without departure from the spirit and scope of this invention. Thus, the scope of the invention should be determined based upon the appended claims and their legal equivalents, rather than the specific embodiments described above.

The invention claimed is:

1. A backup lubrication system for a bearing of a rotor shaft, comprising:
  a backup lubricant reservoir that is passively pressurized and is independent of a primary lubrication system of the bearing;
  a backup lubricant line from the backup lubricant reservoir to the bearing;
  a control valve on the backup lubricant line that is normally closed;
  a controller that monitors a plurality of parameters of the bearing and initiates an emergency protection sequence when a temperature of the bearing exceeds a respective threshold and a flow rate or pressure of a primary lubricant is outside a normal range and a rotation speed of the shaft is above a respective threshold;
  wherein the emergency protection sequence initiates a shut-down procedure for the rotor shaft, and opens and modulates the control valve to meter a backup lubricant from the backup lubricant reservoir to the bearing in proportion to a rundown rate of the rotor shaft, such that lubrication of the bearing from the backup lubricant reservoir continues until the rotor shaft stops turning.

2. The backup lubrication system of claim 1, further comprising logic in the controller that coordinates a braking of the rotor shaft so that the backup lubrication of the bearing continues until the rotor shaft stops turning.

3. The backup lubrication system of claim 1, wherein the controller comprises a logic processor that initiates the emergency protection sequence when the bearing temperature is above a high alarm threshold and below a damage threshold and the primary lubricant pressure or flow rate is outside the normal range and the shaft is rotating.

4. The backup lubrication system of claim 3, wherein the logic processor initiates the emergency protection sequence when the bearing temperature is above the high alarm threshold and a bearing lubricant drain flow rate is below a respective threshold and the shaft is rotating.

5. The backup lubrication system of claim 4, wherein the logic processor initiates the emergency protection sequence when a temperature of the primary lubricant is above a respective threshold and the shaft is rotating.

6. The backup lubrication system of claim 1, wherein the backup lubricant is more fire resistant than the primary lubricant.

7. A rotor shaft bearing lubrication system comprising a primary lubrication system that supplies a primary lubricant through a line to a bearing on a shaft of a rotor in rotating equipment, and characterized by:
  a backup reservoir that contains a backup lubricant, is passively pressurized, and is independent of the primary lubrication system;
  a backup lubricant line from the backup reservoir to the bearing;
  a control valve on the backup lubricant line that is normally closed;
  a monitor/controller that monitors and analyzes a plurality of parameters of the bearing, and initiates an emergency protection sequence that opens the control valve when a temperature of the bearing exceeds a respective threshold and a flow rate or pressure of the primary lubricant is outside a normal range and a rotation speed of the shaft exceeds a respective threshold;
  wherein the emergency protection sequence further initiates a shut-down procedure for the rotating equipment, and modulates the control valve to meter the backup lubricant in proportion to a rundown rate of the rotor so that a backup lubrication of the bearing continues until the rotor stops turning.

8. The bearing lubrication system of claim 7, further comprising logic in the controller that coordinates a braking of the rotor so that the backup lubrication of the bearing continues until the rotor stops turning.

9. The bearing lubrication system of claim 7, wherein the monitor/controller comprises a logic processor that initiates the emergency protection sequence when the bearing temperature is above a high alarm threshold and below a damage threshold, and the primary lubricant pressure or flow rate is outside the normal range, and the shaft is rotating.

10. The bearing lubrication system of claim 9, wherein the logic processor initiates the emergency protection sequence when the bearing temperature is above the high alarm threshold and a bearing lubricant drain has a flow rate below a respective threshold and the shaft is rotating.

11. The bearing lubrication system of claim 10, wherein the logic processor initiates the emergency protection sequence when a temperature of the primary lubricant is above a respective threshold and the shaft is rotating.

12. The bearing lubrication system of claim 7, wherein the backup lubricant is more fire resistant than the primary lubricant.

13. A backup lubrication system for a bearing of a rotor shaft, comprising:
  a pressurized backup lubricant reservoir;
  a backup lubricant line from the backup reservoir to the bearing;
  a control valve on the backup lubricant line that is normally closed;
  a monitor/controller that monitors a plurality of parameters of the bearing, analyzes the parameters, and initiates an emergency protection sequence under any of at least the following conditions:
  a) when a temperature of the bearing exceeds a first threshold, and a flow rate or pressure of a primary lubricant is outside a normal range, and the shaft is rotating;
  b) when the bearing temperature is above the first threshold, and a bearing lubricant drain has a flow rate below a second threshold, and the shaft is rotating;
  c) when a temperature of the primary lubricant is above a third threshold, and the shaft is rotating;
  wherein the emergency protection sequence further initiates a shut-down procedure for a rotor on the rotor shaft, and opens and modulates the control valve to meter a backup lubricant from the backup lubricant reservoir to the bearing in proportion to a rundown rate of the rotor such that lubrication of the bearing from the backup lubricant reservoir continues until the rotor stops turning.

14. The backup lubrication system of claim 13, further comprising logic in the controller that coordinates a braking of the rotor so that the backup lubrication of the bearing continues until the rotor stops turning.

* * * * *